United States Patent [19]

Heaton

[11] 4,249,718
[45] Feb. 10, 1981

[54] BOLT TENSIONING DEVICE

[75] Inventor: Frederick Heaton, Norton Canes, Nr. Cannock, England

[73] Assignee: Hydra-Tight Limited, Manchester, England

[21] Appl. No.: 28,856

[22] Filed: Apr. 10, 1979

[30] Foreign Application Priority Data

Apr. 18, 1978 [GB] United Kingdom ............... 15305/78

[51] Int. Cl.³ ............................................ E21B 19/00
[52] U.S. Cl. .................................................. 254/29 A
[58] Field of Search ..................... 81/57.38; 254/29 A

[56] References Cited

U.S. PATENT DOCUMENTS

| 3,338,552 | 8/1967 | Persicke | 254/29 A |
| 3,351,320 | 11/1967 | Harvey | 254/29 A |
| 3,938,427 | 2/1976 | Warrington | 254/29 A |

FOREIGN PATENT DOCUMENTS 991783  5/1965  United Kingdom .

Primary Examiner—Robert C. Watson
Attorney, Agent, or Firm—John T. Synnestvedt; Charles H. Lindrooth

[57] ABSTRACT

Hydraulic bolt tightening means comprises a body, a piston mounted in the body, the piston and the body being of generally annular configuration to allow the device to be assembled in encircling fashion to a bolt or like components, and an annular chamber between the body and the piston for the admission of fluid under pressure to effect relative axial displacement of the body and the piston whereby the axial dimension is increased, the piston comprising an inner part having a pressure area which is subject to the pressure in said chamber and an outer part to which the fluid pressure is transmitted via said inner part and an interposed mass of solid, yielding and substantially incompressible material whose effective pressure area is less than that of said inner piston part whereby, in use, said mass is caused to expand radially so as to seal against leakage of fluid from the chamber while at the same time transmitting the pressure to the outer piston part.

11 Claims, 3 Drawing Figures

BOLT TENSIONING DEVICE

This invention relates to a device for use in tensioning a bolt or like screw-threaded component to enable a nut or complementary screw-threaded member to be fully tightened onto the bolt or other component so as to stress the bolt and/or associated hardware to a prechosen extent.

There are many situations in which the orthodox method of tightening a nut onto a bolt, i.e. by means of a spanner, proves to be unsatisfactory or very difficult, e.g. where the nuts and bolts are of large size as used in chemical engineering plants and in underwater oil pipelines.

In such situations, a tool is used to tension the bolt so that the nut can be turned with relative ease. One known form of tool comprises an annular hydraulic ram through which the bolt can extend, a generally tubular spacer member for accommodating a nut, engaged with the bolt, and adapted to be located between one side of said ram and a surface against which the nut is to be tightened, and a puller member in the form of an auxiliary nut which is screwed on to the bolt until it abuts the other side of the ram. The effect of actuating the ram is to tension the bolt and the spacer member is arranged so as to allow access to the nut proper to enable it to be turned.

This known form of ram is subject to the drawback that the ram has a very limited stroke and consequently when the nut proper has to be threaded a substantial distance along the bolt with the aid of the tool, it is necessary to carry out the operation in a series of steps involving readjusting the tool each time the ram reaches the limit of its stroke. This drawback arises primarily because of the construction of the ram in that extension of the piston is effected through the agency of a generally toroidal rubber seal into the interior of which the hydraulic oil is supplied. The ram stroke is related to the radial width of the toroid and to obtain a large ram stroke, e.g. 20 mm or more, it would be necessary to have an impracticably large piston chamber to accommodate the seal, i.e. the ram body would have to be made larger with consequent increase in its weight.

The object of the present invention is to provide an improved form of device whose construction allows a relatively long stroke without the device being impracticably bulky and heavy for an operative to handle.

According to the present invention we provide a device comprising a body, a piston mounted in the body, the piston and the body being of generally annular configuration to allow the device to be assembled in encircling fashion to a bolt or like component, and an annular chamber between the body and the piston for the admission of fluid under pressure to effect relative axial displacement of the body and the piston whereby the axial dimension is increased, the piston comprising an inner part having a pressure area which is subject to the pressure in said chamber and an outer part to which the fluid pressure is transmitted via said inner part and an interposed mass of solid, yielding and substantially incompressible material whose effective pressure area is less than that of said inner piston part whereby, in use, said mass is caused to expand radially so as to seal against leakage of fluid from the chamber while at the same time transmitting the pressure to the outer piston.

It will be noted that with this arrangement, the stroke of the piston is not limited by the configuration of the seal and thus a relatively long stroke, e.g. in excess of 20 mm, is possible.

In practice, said material will usually be of natural or synthetic rubber.

Preferably the arrangement is such that the mass of said material is prestressed and thereby radially expanded independently of the hydraulic pressure otherwise there is a possibility that, during initial admission of oil into the chamber, the oil will leak past the seal.

In one embodiment of the invention, the mass of material is constituted by a ring located between inner and outer parts of the piston, the ring being formed with one or more apertures so that the effective area is less than that of the inner end of the piston and the inner part being connected to the outer part by adjustment elements which extend through and fill each of the apertures. The adjustment elements can be operated to draw the piston parts together so as to apply an axial compression to the ring which results in its radial expansion, the adjustment elements being so arranged that they move relatively to the outer piston part and thus do not transmit force from the inner piston part to the outer piston part.

In another embodiment, one of the piston parts is formed with one or more recesses in which projecting portions of the other piston part are received but without making force-transmitting engagement therewith (at least so far as axial forces are concerned), said projections passing through apertures or the like in said mass of material. For example, the inner piston part may be formed with a generally central, continuous rib received in a groove in the other part, the groove being sufficiently deep to preclude the possibility of the rib bottoming therein and said mass of material may be constituted by two separate rings located one on each side of the rib.

The device may be embodied in a tool in which case it will have an auxiliary nut or puller member associated therewith which, in use, is screwed onto the component and co-operates with said piston to effect bolt-stretching. Alternatively the device may be embodied in a nut or the head of a bolt and, in this event, it is used in conjunction with one or more spacers or shims which are inserted between the nut or bolt head and a fixture, e.g. a flange, after stretching the bolt or, alternatively, the nut body or bolt head may be provided with an axially adjustable abutment portion (such as a screw-threaded sleeve) which can be adjusted into abutment with the flange or other fixture after the bolt has been stretched to take up the resulting gap between the nut or bolt head and the flange.

In order to prevent extrusion of said material past the inner part when the device is subject to large hydraulic pressures, there is a tendency for the mass of material to extrude past the outer piston part. One way of reducing this tendency is to provide a rigid back-up ring located between said mass and the outer piston part, the back-up ring having its peripheral edges in close-fitting relation with the chamber walls and being composed of a material having a low coefficient of friction, e.g. P.T.F.E.

In trails conducted using the device disclosed above however it was found that whilst satisfactory results are obtained over a wide range of fluid pressures, at high pressures there is a susceptibility of leakage of oil past the seal afforded by said mass. This is because the high pressure acting on the rubber or like mass trends to extrude it down the sides of the piston even when the back-up ring is present. This problem can be alleviated by using a chamber of greater width but this means that the overall radial dimensions of the device must be increased with consequent increase in weight and greater handling difficulty.

According to a preferred feature of the present invention said mass of material is received within a recess or groove means in the outer piston part.

Preferably the arrangement is such that the mass of material, as well as expanding radially, when pressurised, to sealingly engage the chamber walls, also stresses and elastically deflects the side walls of the recess or groove means towards adjacent surfaces of said body to further enhance sealing. In the preferred embodiment, the side walls of the recess or groove are of tapering configuration towards the inner piston part and terminate in a substantially lineal edge. The base surface of the recess or groove may be substantially flat and the side surfaces thereof may be of frusto-conical configuration, the junctions between the base surface and the side surfaces being radiussed, the radius being relatively sharp to aid the aforesaid flexure of the side walls. Alternatively, the side surfaces of the recess or groove may be arcuate and merge smoothly with the base. In both cases, the seal is conveniently contoured to correspond with the internal configuration of the recess or groove.

In a particularly preferred embodiment, the chamber is in the form of a deep annular cavity in said body and the outer piston part includes a leading annular section which extends into the open mouth of the cavity and is a close sliding fit therein and a trailing section of reduced width which is of such an extent that the root portions of the side walls of the recess or groove are of reduced dimension, thus enhancing the capability of the side walls to deflect elastically.

In order to promote further understanding of the invention several embodiments will not be described by way of example only with reference to the accompanying drawings, in which.

Figure 1:
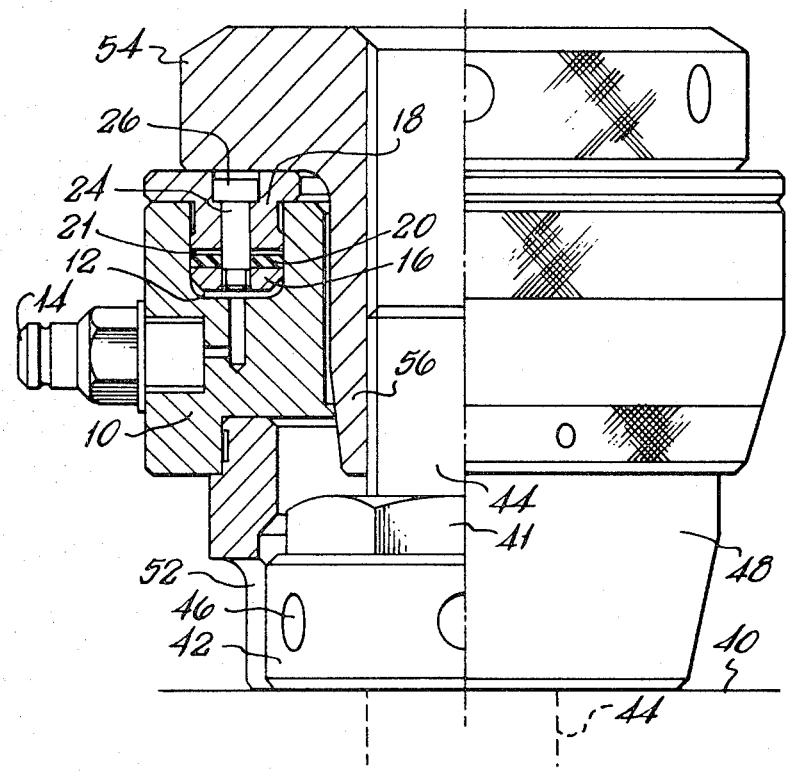
FIG. 1 is a front elevational view, partly cross-sectioned, of one form of hydraulic bolt tensioning device in accordance with the invention.

Referring firstly to FIG. 1, the device comprises an annular body 10 provided with an annular chamber 12 to which hydraulic oil can be supplied via inlet 14. The chamber 12 receives an annular piston comprising an inner part 16 and an outer part which sandwich therebetween a flat-sided rubber ring 20 and a rigid back-up ring 21. The parts 16 and 18 are coupled together by a plurality of equispaced preloading screws 24 (one only shown) which pass through each of a plurality of apertures in the rings 20 and 21. The screws 24 engage in tapped apertures in the part 16 and their heads 26 are arranged so that they can clampingly are secured the outer part 18 without transmitting the fluid pressure in chamber 12 to the outer part. Thus, the force created by the hydraulic oil is transmitted from the inner part 16 to the outer part 18 via the rubber ring 20 and the provision of the apertures in the ring 20 gives rise to an unsupported area corresponding to the cross-sectional area of the apertures. Thus the rubber ring has an effective area which is less than that of the piston by the area of the apertures when hydraulic pressure is applied, it is compressed axially with consequent radial expansion into sealing engagement with the chamber walls. Since the rubber ring has a smaller area the per unit force or pressure exerted on the ring is correspondingly increased.

To reduce any tendency for the ring 20 to extrude along the sides of the piston when subject to hydraulic pressure, the back-up ring 21, conveniently of P.T.F.E., is provided between the rubber ring 20 and the outer piston part 18. Also to preclude the possibility of the oil leaking past the rings during initial admission of the oil, the preloading screws 24 may be used to prestress the ring 20 into sealing engagement with the chamber walls, i.e. the effect of turning the screws 24 in the appropriate sense is to draw the inner and outer piston parts 16, 18 towards one another to compress the ring 20 axially, thereby causing it to expand in a radial direction.

FIG. 1 shows the tool according to the invention in operation. Numeral 40 depicts a surface of for example a flange against which the nut 41, engaged with the bolt 44, is to be tightened against. The faces of the nut are drilled at 46 to receive a tommy bar (not shown). Alternatively, a collar fitted about the nut may be so drilled. The nut is received within a generally tubular spacer 48 to which the body 10 is connected. A slot 52 is provided in the wall of the spacer 48 to allow operative access to the nut 41 by means of the tommy bar. The end of the bolt is engaged by a puller nut 54 which includes a sleeve 56 which extends into the central aperture in the body 10. In use, the device is initially contracted and the puller nut 54 is threaded on to the bolt until the nut 54 abuts the ram. The device is then extended by supplying oil to the chamber 12 so as to stress the bolt thereby allowing the nut 41 to be turned with ease. Thus, by progressively extending the device, the nut 42 can be tightened to the required extent.

Figure 2:
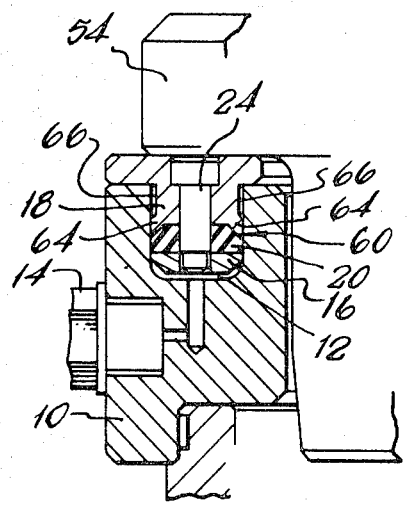
FIG. 2 is a fragmentary view of a modification of the embodiment shown in FIG. 1.

FIG. 2 illustrates a modification of the tool of FIG. 1. In this embodiment, the rubber ring 20 is now seated in a recess or groove 60 in the outer piston part 18. This arrangement prevents extrusion of the rubber past the part 18 when subject to high pressures and eliminates the need for the ring 21. The side walls of the groove 60 are generally frusto-conical and taper to substantially lineal edges and are designed so that they will be deflected elastically by radial expansion of the rubber ring, when the latter is subject to high pressure, thereby bringing the lineal edges of the side walls into closer contact with the walls of the chamber and resisting the tendency for the rubber to extrude down the sides of the piston part 18. To further enhance such deflection, the part 18 is of reduced width, as indicated by the reference numeral 66, at least in the vicinity of the base of the groove 60 so as to form reduced width zones 64 about which the side walls tend to flex.

Figure 3:
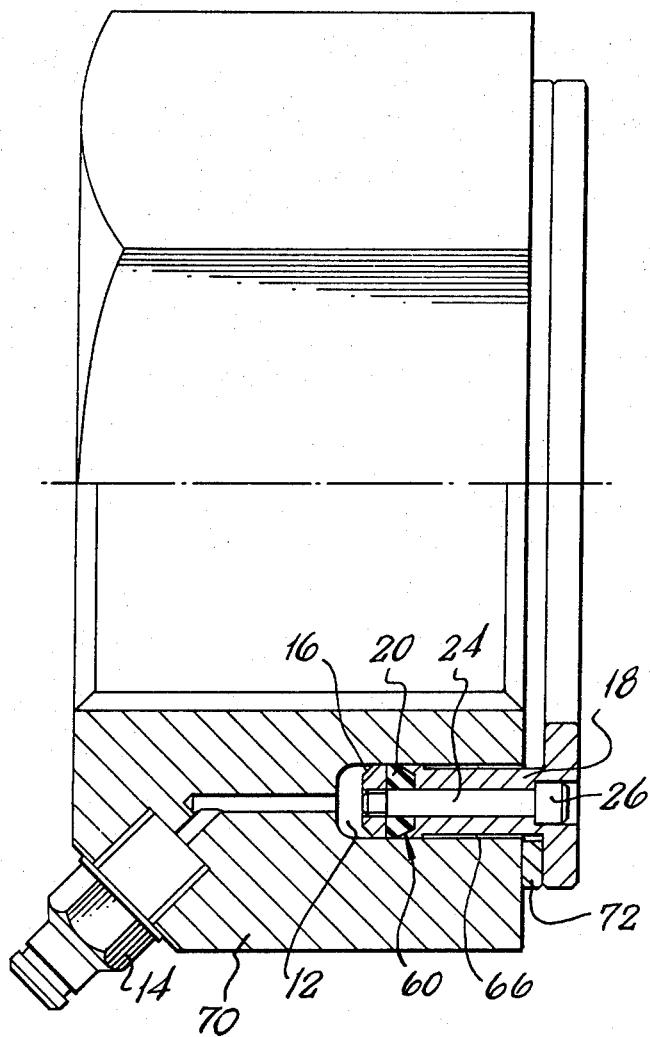
FIG. 3 is a part-sectional view of the device in accordance with the invention when embodied in a nut.

FIG. 3 illustrates a nut which embodies the device of the invention and like parts are identified by like reference numerals in FIGS. 1, 2 and 3. In this case, the chamber 12 is formed in the body 70 of the nut per se. Shims 72 are used to take up the play created by stretching of the bolt. Thus, initially the nut is screwed on to the bolt until the nut abuts the flange or the like. The device is then extended by supplying oil to the chamber 12 to stretch the bolt and the stretch is taken up by inserting one or more shims 72 between the nut and the flange.

Various modifications of the illustrated embodiment are possible; e.g. instead of being connected by adjusting means 24, the inner and outer parts may be connected by a projection or projections on part 16 which enter blind bores or recesses in the part 18 but without bottoming therein. Such projection(s) may be in the form for example of a continuous rib(s) on the part 16 which enters a corresponding groove in the part 18.

I claim:

1. A device comprising a body, a piston mounted in said body, the piston and the body being of generally annual configuration to allow the device to be assembled in encircling fashion to a bolt or like components, and an annular chamber between the body and the piston for the admission of fluid under pressure to effect relative axial displacement of the body and the piston whereby the axial dimension is increased, the piston comprising an inner part having a pressure area which is subject to the pressure in said chamber and an outer part to which the fluid pressure is transmitted via said inner part and an interposed mass of solid, yielding and substantially incompressible material, said mass having an effective pressure area less than that of said inner piston part, and means communicating the pressure in said chamber to the effective pressure area of said inner piston part, said mass being free for radial expansion, so as to seal against leakage of fluid from the chamber while at the same time transmitting the pressure to the outer piston part.

2. A device as claimed in claim 1 further comprising means for prestresing the said mass of material and thereby radially expanding the same independently of the hydraulic pressure.

3. A device as claimed in claim 1 in which the mass of material is comprised of a ring located between inner and outer parts of the piston, the ring being formed with one or more apertures so that its effective area is less than that of the inner end of the piston, and adjustment elements connecting the inner part to the outer part said adjustment elements being operated to draw the piston parts together so as to apply an axial compression to the ring which results in its radial expansion, the adjustment elements being moveable relatively to the outer piston part when fluid is admitted to said annular chamber so that they do not transmit force from the inner piston part to the outer piston part.

4. A device as claimed in claim 1 in which the outer piston part is formed with one or more recesses, said other piston part having projecting portions being received in said recess without making axial force-transmitting engagement therewith, said projections passing through apertures in said mass of material.

5. A device as claimed in any one of claims 1-4 further comprising a rigid back-up ring between said mass and the outer piston part, the back-up ring having its peripheral edges in close-fitting relation with the chamber walls and being composed of a material having a low coefficient of friction.

6. A device as claimed in any one of claims 1-4 further comprising a recess in the outer piston part in which said mass of material is received.

7. A device as claimed in claim 1 further comprising a recess in the outer piston part in which said mass of material is received, said recess being defined by an annular side wall portion, said side wall portion being elastically deflectable towards the adjacent surfaces of said body in response to radial expansion of said mass of material.

8. A device as claimed in claim 7 in which the side walls of the recess or groove are of tapering configuration towards the inner piston part and terminate in a substantially lineal edge.

9. A device as claimed in claim 8, in which the seal is contoured to correspond with the internal configuration of the recess or groove.

10. A device as claimed in claim 1 in which the chamber is in the form of a deep annular cavity in said body and the outer piston part includes a leading annular section which extends into the open mouth of the cavity and is a close sliding fit therein and a trailing section of reduced width which is of such extent that the root portions of the side walls of the recess or groove are of reduced dimension.

11. A device as claimed in claim 7 in which the device is embodied within a nut.

* * * * *

UNITED STATES PATENT AND TRADEMARK OFFICE
CERTIFICATE OF CORRECTION

PATENT NO. : 4,249,718
DATED : February 10, 1981
INVENTOR(S) : Frederick Heaton

It is certified that error appears in the above—identified patent and that said Letters Patent is hereby corrected as shown below:

Col. 3, line 37: "not" should be --now--.

Col. 3, line 56: "engage" should be --are secured--.

Col. 3, line 58: "are secured" should be --engage--.

Col. 5, line 28: "prestresing" should be --prestressing--.

Signed and Sealed this

Nineteenth Day of May 1981

[SEAL]

Attest:

RENE D. TEGTMEYER

Attesting Officer

Acting Commissioner of Patents and Trademarks